United States Patent [19]

Beatty et al.

[11] Patent Number: 4,753,716

[45] Date of Patent: Jun. 28, 1988

[54] SELECTIVE CONVERSION OF POLYMER COATINGS TO CERAMICS

[75] Inventors: Charles L. Beatty; John R. Eyler; Clifford H. Watson, all of Gainesville, Fla.

[73] Assignee: University of Florida, Gainesville, Fla.

[21] Appl. No.: 23,267

[22] Filed: Mar. 9, 1987

[51] Int. Cl.$^4$ .................... C01B 33/00; C04B 35/52; C04B 35/58

[52] U.S. Cl. .................... 204/157.41; 204/157.44; 204/157.45; 204/157.46; 204/157.47

[58] Field of Search .............. 501/97, 88; 204/157.15, 204/157.4, 157.43, 157.44, 157.41, 157.45, 157.47, 157.64, 157.74, 157.6, 157.61, 157.63, 157.46

[56] References Cited

PUBLICATIONS

Cannon et al, J. Am. Ceram. Soc. 65, pp. 324–330 (1982).
Cannon et al, J. Am. Ceram. Soc. 65, pp. 330–335 (1982).
C. L. Beatty, "Silicon Nitride and Silicon Carbide from Organometallic and Vapor Precursors: Ultra Structure Processing of Ceramics, Glasses, and Compositions", editor Hench et al, Chapter 23, pp. 272–292, John Wiley & Son (New York, 1984).

Primary Examiner—John F. Niebling
Assistant Examiner—Ben C. Hsing
Attorney, Agent, or Firm—John H. Faro

[57] ABSTRACT

A process for the selective conversion of a polymer coating to a ceramic material is disclosed. This process initially involves the provision of a polymer film which has been generated by R. F. plasma vapor phase polymerization of a monomer comprising an inorganic (i.e. silicon) or an organometallic constituent on a receptive substrate. The polymer is thereafter selectively exposed to a coherent or focused energy source (i.e. $CO_2$ laser) at the appropriate wavelength and power output to effect in situ conversion of a polymer film to a ceramic deposit which is substantially devoid of carbonaceous impurities. This process is also unique for its ability to provide a ceramic deposit that is firmly adherent on a variety of receptive substrates. The degree of adherence is far superior to ceramic coatings derived by chemical vapor deposition (CVD) techniques. The process lends itself to the formation of ceramic patterns which have application in the microelectronics industry.

8 Claims, No Drawings

SELECTIVE CONVERSION OF POLYMER COATINGS TO CERAMICS

GOVERNMENT RIGHTS

This invention was made with Government support under Contract No. F49620-83-C-0072 awarded by the U.S. Air Force. The Government has certain rights in this invention.

BACKGROUND OF THE INVENTION

1. Field of the Invention

This invention relates to a process and to the products produced thereby. More specifically, this invention is directed to a process for the in situ generation of high purity ceramics on a variety of substrates. The starting materials utilized in this process comprise a polymer film which has been formed by R.F. plasma vapor phase polymerization of a monomer comprising inorganic or organometallic constituents. The conversion energy is supplied by selective exposure of the film to a coherent or focused energy source of the appropriate power output and wavelength and for the appropriate duration.

2. Description of the Prior Art

The methods for formation of ceramic powders and objects are well known to the prior art. The formation of a ceramic object is usually preceded by mixing a blend of refractory powders of varying particle sizes, the compression of the refractory mixture into a "green" body and the controlled firing or sintering of the green body for a prescribed interval. The resultant object will generally be porous and its physical properties characteristic of a ceramic.

The prior art also discloses the preparation of sinterable ceramic powders from reactant gases which are rapidly heated by a $CO_2$ laser, see Cannon et al, J. Am. Ceram. Soc. 65, pp. 324–330 (1982); and Cannon et al, Ibid., 65, 330–335. This article describes the decomposition of the reactant gases, thus, causing particles to nucleate and grow rapidly. This process reportedly permits the formation of ceramic particles essentially free from defects. This vapor phase method is reportedly superior to the more conventional furnace, R.F.-heated and arc-plasma-heated gas-phase synthesis techniques because of their less than ideal thermal profiles and because of the reaction zones of the equipment do not allow for distribution in nucleation rates and growth times.

The prior art also discloses the preparation of ceramic coatings from R.F. plasma polymerized polymer film, C. L. Beatty, "Silicon Nitride and Silicon Carbide from Organometallic and Vapor Precursors: Ultrastructure Processing of Ceramics, Glasses and Composites", editor Hench, et al, Chapter 23, pp. 272-292, John Wiley & Son (New York, 1984). The Beatty paper also describes the conversion of such coatings to ceramics by conventional pyrolysis techniques. Unfortunately, the resultant ceramics produced by such techniques were contaminated with carbonaceous inclusion or oxygen and, thus, did not possess the degree of purity required for electronics components or other applications where crystalline purity is a must.

OBJECT OF THE INVENTION

It is the object of this invention to remedy the above as well as related deficiencies in the prior art.

More specifically, it is the principal object of this invention to provide a method for the in situ formation of ceramic materials on a supporting substrate.

It is another object of this invention to provide a method for a formation of a ceramic pattern on a supportive substrate having both gross and fine feature resolution.

It is yet another object of this invention to provide a method for the selective patterning of ceramic materials in response to laser irradiation.

It is still yet another object of this invention to provide a method for the selective conversion of polymeric films to ceramic materials by selective irradiation of such films with laser irradiation.

Additional objects of this invention will include, the articles of manufacture produced in accordance with the foregoing methods. These articles of manufacture are characterized by their superior adherence to substrates, absence of inclusions or other physical defects (i.e. pinholes) and moisture and vapor barrier properties.

SUMMARY OF THE INVENTION

The above and related objects are achieved by initially providing a polymer film which has been formed on a supporting substrate by R.F. plasma vapor phase polymerization techniques. This polymer film is then selectively converted to ceramic materials by exposure thereof to laser irradiation at the appropriate wavelength and power output. The duration of exposure is sufficient to effect the conversion of the film, in the exposed areas, to an essentially pure crystalline ceramic deposit. This ceramic deposit is localized and faithfully conformed to the distribution of laser energy within the polymer film. The ceramic deposit can be made to conform to any pattern of laser energy distribution and, thus, has obvious application in the fabrication of printed circuit boards and other SMT devices.

DESCRIPTION OF THE INVENTION INCLUDING PREFERRED EMBODIMENTS

The process of this invention provides a unique route for the fabrication of high purity, ceramic coatings having excellent bonding to a supportive substrate. This process is also unique in its ability to form such coatings without the common types of physical defects (i.e. pinholes) which plague the more traditional chemical vapor deposition processes.

Initially, a polymer film is formed on the supporting substrate by an R.F. plasma vapor phase polymerization process. The method of generation of this polymer film is believed to be critical to the process of this invention. In the preferred embodiments of this invention, the film is generated by R.F. plasma vapor phase polymerization of a "silicon containing monomer" onto a supportive substrate. The phrase "silicon containing monomer" as used herein, is intended as descriptive of a compound containing both carbon and silicon atoms which can be converted by radio frequency energy to free radicals or to an ionized gas. The film fabricated in this manner is of a controlled thickness and distribution upon the supportive substrate.

Following formation of the polymer film from the silicon containing monomer, the film is selectively exposed to a coherent or focused energy source (i.e. representative conversion energy sources, electron beams; X-ray; $CO_2$ laser @ 10.6 $\mu$m; Nd: YAG laser @ 106 $\mu$m, or 532 nm or 355 nm or 266 nm; Ar—ion laser or excimer lasers at various wavelengths in the ultraviolet region of the electromagnetic spectrum) at the appropriate wavelength and power output. The duration of exposure is sufficient to effect rapid conversion of the exposed regions of the polymer film to ceramic material. This conversion occurs in situ and without alteration of the polymer film in the areas which have been shielded from similar irradiation. The crystalline composition of the ceramic material thus produced will, of course, vary with the elemental composition of the polymer. In one of the preferred embodiments of this invention, an R.F. plasma polymerized film is derived from hexamethylcyclotrisilazane. The silicon is, thus, present in the recurring structure units of the polymer. The selection of conversion energy source is dictated by the absorption characteristics of this polymer film. In this instance, a $CO_2$ laser ($\lambda = 10.6$ $\mu$m) was the conversion energy source most appropriate to the task. The physical appearance of the resultant ceramic is indicative of a highly pure crystalline structure. The infrared spectrum of the ceramic deposit and its color closely resembles the infrared spectrum of pure silicon carbide or silicon nitride crystals (depending upon the precursor material).

The silicon containing monomers which can be used in the formation of R.F. plasma vapor phase polymerized coatings and films include the silazanes and silanes of the following formulae:

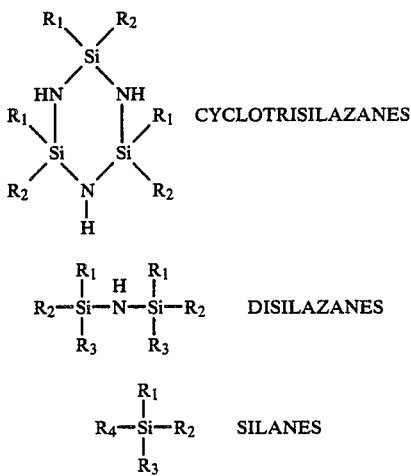

wherein $R_1$, $R_2$, $R_3$ and $R_4$ are independently selected from the group consisting of hydroxyl, aryl or alkyl of 1 to 5 carbon atoms.

In the preferred embodiments of this invention, $R_1$, $R_2$, $R_3$ and $R_4$ are the same; and, are either methyl or ethyl. The preferred compounds suitable for use in the process of this invention, thus, include: hexamethylcyclotrisilazane, hexaethylcyclotrisilazane, hexamethyldilazane, hexaethyldisilazane, trimethyl silane, triethyl silane, tetramethyl silane or tetraethyl silane.

The above monomers can be polymerized by R.F. plasma vapor phase polymerization techniques onto a suitable, supportive substrate. The films prepared in the foregoing manner are highly cross-linked and are of a uniform thickness. This ability to control uniformity of the resultant film is possible even where the surface upon which the film is deposited is irregular. In brief, the formation of such films involves R.F. plasma induced vapor phase polymerization (preferably utilizing power levels sufficiently low to enable substrate and the reactor environment to remain at ambient temperature) to induce formation/conversion of the monomer into free radicals. These free radicals can then combine in random fashion to form a highly cross-linked polymer film on a receptive substrate. The R.F. plasma polymerization technique which is suitable for use in the fabrication of such films is described in the open literature, see for example Beatty, "*Silicon Nitride and Silicon Carbide from Organometalic and Vapor Precursors: Ultrastructure Processing of Ceramics, Glasses and Composites*", editor Hench, et al, Chapter 23, pp. 272–292, John Wiley & Son (New York, 1984) (which is hereby incorporated by reference in its entirety).

As noted above, the R.F. plasma vapor phase polymerization is directed to effect formation of a film or coating on a receptive substrate. The cross-linked nature of the polymer, in addition to the in situ formation upon the substrate, insures the creation of an extremely intimate and firm bond between the substrate and polymer. Substrates which can provide a receptive surface for such polymer film formation include various metal surfaces, synthetic surfaces and ceramic surfaces (i.e. ceramics which have been generated by the process of this invention). The surface of these substrates need not be specially prepared other than to insure that the polymer receptive surface thereof is essentially free of contaminants (i.e. grease or dirt). This can be accomplished by exposing the substrate to the R.F. plasma prior to introduction of the monomer reactants.

In a number of the preferred embodiments of this invention, the substrate can provide a fugitive support; that is, once the polymer film has been formed, or once the polymer film has been selectively converted to ceramic, the substrate can be chemically or physically etched away thereby leaving a self-support film, or a ceramic structure which has been derived from the polymer film. It is also contemplated that a plurality of R.F. plasma polymer films may be prepared from different materials and formed upon one another. Each of the films would contain a ceramic precursor different from the other. Accordingly, the laminate could be subjected to different conversion energies thereby sequentially converting each film, thereby producing a ceramic composite. This process also lends itself to the formation of coatings possessing varying gradients of materials within the ceramic. This gradient effect is achieved by progressively changing the content of the reactant composition during the plasma polymerization phase of the process.

As noted above, in the preferred embodiments of this invention, the polymer film containing the ceramic precursor (which is formed by R.F. plasma induced polymerization), is selectively exposed to an emission from a conversion energy source, the amount of energy impinging upon the film being sufficient to effect its selective conversion to a ceramic. The amount of energy is carefully modulated to effect such conversion without generation of free carbon or graphite particle inclusions. Carbon dioxide lasers are effective for this purpose, where the polymer film has been prepared from silicon containing monomers (i.e. trisilazanes, disilazanes and silanes). The energy absorption characteristics of these materials are closely matched to the laser emissions of a carbon dioxide laser. The power output of the laser and the duration of exposure are controlled in order to effect the both rapid selective conversion of the films prepared from these monomers to the corresponding ceramic. The resultant ceramic has an infrared absorption spectrum which closely approximates pure silicon carbide crystals.

As noted above, the R.F. plasma polymerized films can also be converted to the corresponding ceramic by other conversion energy sources (i.e. electron beam, X-rays, Nd: YAG lasers, excimer laser, Ar—ion lasers).

The conditions prevailing during such conversion will of course be dependent upon the energy source. Ordinarily, the selective irradiation of the R.F. plasma polymerized film with laser energy is carried out under carefully controlled conditions in order to insure that the resultant ceramic is free from contaminants. In the preferred embodiments of this invention, such control over the conversion process is effected by the performance of such conversion in an inert environment, (i.e. a non-oxidizing environment, such as argon or nitrogen atmosphere).

As noted above, the conversion process of this invention can produce composite ceramic materials. This can be effected by sequentially converting a polymer film to a ceramic and then forming a second polymer film over the ceramic and repeating the conversion process. Alternatively, a series of R.F. plasma polymerized films can be prepared one upon the other. Each of the films which are formed in this manner would be prepared from different ceramic precursor materials. The selection of such different materials would be based upon their energy absorption characteristics. For example, a series of films could be formed, one upon the other, and then the conversion effected with laser energy of defined wavelengths. In the context of this invention, this would be achieved by simply irradiating the top layer with activation energy within its unique area of absorption. Upon conversion of this top polymer film to the corresponding ceramic, the remaining film would be removed by selective chemical etching techniques. The underlying film would then be converted to its corresponding ceramic by activation with yet another energy source which would be uniquely matched to the ceramic precursor of the underlying polymer film. The process of etching and conversion could be repeated depending upon the number of contiguous polymer films which are initially prepared. The resulting composite would, thus, contain a variety of ceramic materials, presumably in some cooperative relationship. This technique could be used to prepare various masking devices. For example, one of the ceramic materials which could be obtained in the foregoing fashion, could be absorptive of certain imaging energies. In this manner, a high resolution mask could be formed without going through the laborious process of stenciling, etching and chemical vapor deposition, as is common in the manufacture of masks for the microelectronics industry. Such high resolution ceramic patterns can also be formed concurrent with the plasma polymerization of the monomers. This would involve combining the conversion energy source (i.e. laser) and the plasma irradiation step in a single continuous process to achieve a laser assisted R.F. plasma patterned ceramic film deposition.

The examples which follow provide a number of specific illustrations of the preferred embodiments of this invention. The apparatus and techniques used in these examples are standard or hereinbefore described. Parts and percentages listed in these examples are by weight unless otherwise stipulated.

EXAMPLE I

The following procedure was used to form ceramic deposits upon a series of substrates. Initially, a substrate was cleaned (degreased), placed in an R.F. plasma reaction chamber and the chamber evacuated until the pressure within reduced to about 15 torr. The plasma was then started and the substrate exposed thereto for a period of about 30 minutes in order to insure that its surface was free from contamination. The monomer, hexamethyltrisilazane, was then introduced into the chamber and the pressure within the chamber allowed to rise to about 200 torr. The radio frequency of the chamber was maximized at 50 watts and the polymerization of the monomer allowed to proceed for about 1 hour. The amount of monomer introduced into the chamber is determined empirically to yield a polymer coating on the substrate of approximately one (1) micron. Polymer coating thickness can also be influenced by a number of factors, including the R.F. power level, reaction time and monomer pressure within the polymerization chamber.

The polymer coated substrate prepared in the above manner is now removed from the plasma chamber and placed in a vacuum chamber so as to insure adequate control over the environmental conditions during selective exposure of the surface of the polymer coating to conversion energies. The preferred energy source used in this conversion was a grating tuned continuous wave carbon dioxide laser which operates over a wavelength range of from about 9 to 11 microns with a maximum power output of 60 watts. An alternative source of conversion energy used in this process was an excimer laser operating at 308 nm.

Typical irradiation time used in the conversion process ranged from 10–60 seconds depending upon the power setting. The selection of source of conversion energy, the power of this energy source, the efficiency of absorption of the energy by the polymer film and the duration of exposure are carefully matched, based upon empirical testing, to selectively effect conversion of the polymer to a corresponding ceramic that is exposed to this conversion without the formation of carbonaceous inclusions. The ceramic thus produced is essentially pure crystalline material.

The foregoing process was used with varying degrees of success in the formation of a ceramic deposition upon the following substrates:
 stainless steel
 brass
 glass
 quartz
 mylar
 silicon wafers The best results were obtained utilizing a stainless steel substrate. This is believed attributable to one or more of the following factors: (a) the quality of the R.F. plasma polymerized polymer coating in this substrate; (b) the bonding characteristics of the coating to the substrate; and/or (c) the ability of the substrate to rapidly and uniformly dissipate heat generated during the conversion process.

The foregoing description and examples have been provided to illustrate some of the preferred embodiments of this invention. As is evident, the invention described herein is not to be limited by such disclosure, but rather is set forth in the claims which follow.
 What is claimed is:

1. A process for the selective in situ conversion of a portion of a polymer film to a ceramic by selective irradiation of said film with a coherent or focused energy source, the quantum of energy imparted to said film being sufficient to effect rapid conversion of the film, in the irradiated areas, to the corresponding ceramic material, said process comprising:

(a) providing a supportive substrate having bonded thereto a polymer film which has been formed by R.F. plasma vapor phase polymerization of at least one precursor compound of the formula:

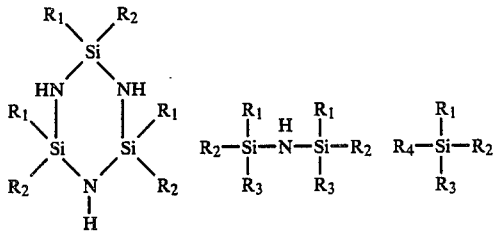

wherein $R_1$, $R_2$, $R_3$ and $R_4$ are independently selected from the group consisting of hydroxyl, aryl or alkyl of 1 to 5 carbon atoms;

(b) selectively irradiating said polymer film with a coherent or focused energy source sufficient to effect rapid in situ conversion of the irradiated portions of the polymer film to a silicon based ceramic, the extent of such conversion of the film to ceramic being confined to the pattern of distribution of the energy within the film.

2. The process of claim 1, wherein the polymer film is formed of a monomer selected from the group consisting of hexaethylcyclotrisilazane, hexamethyldisilazane and tetramethylsilane.

3. The process of claim 1, wherein the pattern of laser distribution of conversion energy within the polymer film is in the form of a raster.

4. The process of claim 1, wherein the conversion energy is provided by a laser, electron beam or X-ray bombardment.

5. The process of claim 1, wherein the energy source selected for such conversion process is a carbon dioxide laser.

6. The process of claim 1, wherein the lapsed time between irradiation and conversion of a polymer film is insufficient to effect carbonization of the vaporizable constituents of the polymer.

7. The process of claim 1, wherein the supportive substrate is removed in those areas corresponding to conversion of a polymer film to ceramic material, thereby leaving a self-supporting ceramic.

8. The process of claim 1, wherein the unexposed portions of the polymer film are selectively removed from the substrate without disturbing that portion of the film which has been selectively converted to ceramic material.

* * * * *